United States Patent
Kimura et al.

(10) Patent No.: US 9,404,832 B2
(45) Date of Patent: Aug. 2, 2016

(54) DEGRADATION DIAGNOSIS DEVICE AND DEGRADATION DIAGNOSIS METHOD FOR EXHAUST GAS SENSOR

(75) Inventors: Tamikazu Kimura, Atsugi (JP); Azusa Kobayashi, Isehara (JP); Noriko Yamanaka, Yamato (JP)

(73) Assignee: NISSAN MOTOR CO., LTD., Yokohama-shi, Kanagawa (JP)

( * ) Notice: Subject to any disclaimer, the term of this patent is extended or adjusted under 35 U.S.C. 154(b) by 428 days.

(21) Appl. No.: 14/125,691

(22) PCT Filed: Jun. 18, 2012

(86) PCT No.: PCT/JP2012/065457
§ 371 (c)(1),
(2), (4) Date: Dec. 12, 2013

(87) PCT Pub. No.: WO2013/005562
PCT Pub. Date: Jan. 10, 2013

(65) Prior Publication Data
US 2014/0102166 A1 Apr. 17, 2014

(30) Foreign Application Priority Data
Jul. 1, 2011 (JP) ................................. 2011-146961

(51) Int. Cl.
| G01M 15/10 | (2006.01) |
| F01N 11/00 | (2006.01) |
| F02D 41/14 | (2006.01) |
| F02D 41/22 | (2006.01) |
| F02D 41/18 | (2006.01) |

(52) U.S. Cl.
CPC ............ *G01M 15/102* (2013.01); *F01N 11/00* (2013.01); *F02D 41/1441* (2013.01); *F02D 41/1454* (2013.01); *F02D 41/1495* (2013.01); *F02D 41/222* (2013.01); *F01N 2550/00* (2013.01); *F01N 2560/02* (2013.01); *F02D 41/18* (2013.01); *Y02T 10/40* (2013.01); *Y02T 10/47* (2013.01)

(58) Field of Classification Search
None
See application file for complete search history.

(56) References Cited

FOREIGN PATENT DOCUMENTS

| JP | H03-57862 A | 3/1991 |
| JP | H11-166438 A | 6/1999 |
| JP | 2000-039418 A | 2/2000 |
| JP | 2000-039418 A | 2/2000 |
| JP | 2005-083213 A | 3/2005 |
| JP | 2007-032537 A | 2/2007 |
| JP | 2010-025089 | 2/2010 |

*Primary Examiner* — Robert R Raevis
(74) *Attorney, Agent, or Firm* — Drinker Biddle & Reath LLP

(57) ABSTRACT

Provided is a device for performing degradation diagnosis of a downstream-side exhaust gas sensor. When a diagnosis condition is met, an intake-air quantity is successively accumulated to obtain an intake-air-quantity accumulation value, an intake-air-quantity average value is obtained as an average of the intake-air quantity from the start of diagnosis, and, on the basis of this intake-air-quantity average value, an intake-air-quantity accumulation threshold value is set. When the intake-air-quantity accumulation value reaches the intake-air-quantity accumulation threshold value, the diagnosis is terminated, and an output reversal number of the downstream-side exhaust gas sensor during the diagnosis period is compared with a threshold value to judge whether the sensor is normal or degraded. By setting the intake-air-quantity accumulation threshold value on the basis of the intake-air-quantity average value, influence from the flow velocity of the exhaust gas passing through a catalytic device and the downstream-side exhaust gas sensor is removed.

4 Claims, 4 Drawing Sheets

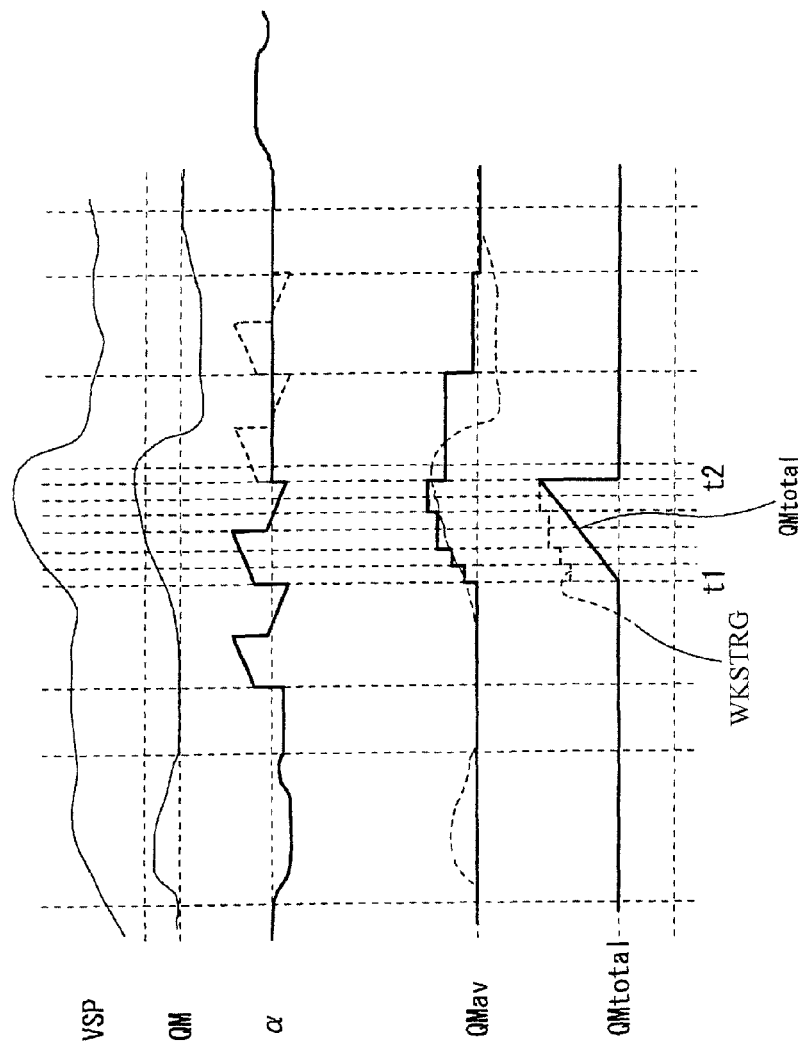

DEGRADATION DIAGNOSIS DEVICE AND DEGRADATION DIAGNOSIS METHOD FOR EXHAUST GAS SENSOR

TECHNICAL FIELD

The present invention relates to degradation diagnosis device and method for judging the degradation of an exhaust gas sensor which is provided to an exhaust passage of an internal combustion engine for detecting an exhaust composition, and more particularly relates to degradation diagnosis device and method for judging the degradation of a downstream-side exhaust gas sensor provided downstream from a catalytic device.

BACKGROUND ART

An air-fuel-ratio control device is known which includes an exhaust gas sensor (so-called linear air-fuel ratio sensor or oxygen sensor) in an exhaust passage of an internal combustion engine in order to control an air-fuel ratio of the internal combustion engine by way of feedback control. Moreover, a structure is known in which an exhaust gas sensor is provided downstream from a catalytic device in addition to an exhaust gas sensor provided upstream from the catalytic device in order to further improve an accuracy of the air-fuel ratio control.

A responsivity of output of such an exhaust gas sensor might be worsened due to secular degradation or thermal degradation. Hence, various degradation diagnosis devices have been previously proposed. Patent Literature 1 discloses to perform a degradation diagnosis on the basis of a reversal period of an output signal of the exhaust gas sensor. Specifically, since this reversal period is influenced by a load of the internal combustion engine, i.e. by an intake-air quantity, a degradation-determination threshold value is set at a smaller value as an accumulated intake-air quantity over a predetermined diagnosis period becomes larger. Then, it is determined that the exhaust gas sensor is in a degraded state, when the detected reversal period is longer than the degradation-determination threshold value.

The degradation diagnosis device disclosed by Patent Literature 1 is constructed based on a recognition that a certain quantity of exhaust gas (accumulation value) needs to flow through the exhaust gas sensor in order to attain the reversal of the output of the exhaust gas sensor. In a case that the intake-air quantity (a flow quantity per unit time) is relatively large, the certain quantity of exhaust gas (accumulation value) is realized in a relatively short time. Hence, in this case, the degradation-determination threshold value for the reversal period is set at a relatively small value. The technique of Patent Literature 1 is intended for the exhaust gas sensor located upstream from the catalytic device.

However, in a degradation diagnosis for the exhaust gas sensor located downstream from the catalytic device, a variation of exhaust composition around the exhaust gas sensor is influenced by an oxygen storage capacity of the catalytic device. Moreover, an exhaust-gas quantity (accumulation value) required to attain the output reversal of the exhaust gas sensor is affected by a flow velocity of exhaust gas flowing through the catalytic device. That is, according to a new finding of the inventors of the present application, in the case of the downstream-side exhaust gas sensor, a great deal of exhaust gas (accumulation value) is necessary to attain the reversal of the output of the exhaust gas sensor if the flow velocity of exhaust gas passing through the catalytic device and the downstream-side exhaust gas sensor is high. In other words, when the intake-air quantity (flow quantity per unit time) is large, the flow velocity of exhaust gas passing through the catalytic device and the downstream-side exhaust gas sensor is high, so that the exhaust gas quantity (accumulation value) or the intake-air quantity (accumulation value) necessary for one-time reversal of the output is large.

In the degradation diagnosis device disclosed by Patent Literature 1, such an influence from the flow velocity has not been considered. Hence, a proper diagnosis for the downstream-side exhaust gas sensor cannot be carried out.

CITATION LIST

Patent Literature

Patent Literature 1: Japanese Patent Application Publication No. H11-166438

SUMMARY OF THE INVENTION

According to the present invention, a degradation diagnosis device for an exhaust gas sensor provided downstream from a catalytic device in an exhaust-gas passage of an internal combustion engine includes: a threshold-value setting means configured to set an intake-air-quantity accumulation threshold value according to an intake-air quantity of the internal combustion engine such that the intake-air-quantity accumulation threshold value becomes larger as the intake-air quantity becomes larger; a diagnosis-period setting means configured to calculate an accumulation value by accumulating the intake-air quantity from a start time of a diagnosis, and to terminate a diagnosis period when the accumulation value reaches the intake-air-quantity accumulation threshold value; and a degradation judging means configured to judge whether the exhaust gas sensor is in a degraded state on the basis of a reversal number of an output of the exhaust gas sensor over the diagnosis period.

A basic concept according to the present invention is based on a recognition that the accumulation (integration) of the intake-air quantity, i.e. a total exhaust-gas quantity which has passed through the catalytic device and the downstream-side exhaust gas sensor needs to have a prescribed accumulation value in order to attain the output reversal of the exhaust gas sensor if the exhaust gas sensor is not in the degraded state. Therefore, the output reversal number of the exhaust gas sensor over the diagnosis period which is terminated when the accumulation value of the intake-air quantity reaches the predetermined intake-air-quantity accumulation threshold value is greater than or equal to a predetermined number of times if the exhaust gas sensor is not in the degraded state. As the exhaust gas sensor comes to be degraded, the output reversal number comes to be smaller. Eventually, the degraded state is determined.

According to the present invention, the intake-air-quantity accumulation threshold value is set according to the intake-air quantity (flow quantity per unit time). Specifically, the intake-air-quantity accumulation threshold value is given as a larger value as the intake-air quantity becomes larger, i.e. as the flow velocity of the exhaust gas becomes higher. Accordingly, the above-mentioned influence of the flow velocity of exhaust gas can be cancelled. As a result, a more appropriate diagnosis can be performed.

In the degradation diagnosis device for an exhaust gas sensor according to the present invention, the influence from the flow velocity of exhaust gas passing through the catalytic device and the downstream-side exhaust gas sensor can be removed, so that the degradation is diagnosed with a high degree of accuracy.

BRIEF EXPLANATION OF DRAWINGS

FIG. 4 A time chart showing one example of the degradation diagnosis.

DETAILED DESCRIPTION OF INVENTION

Figure 1:
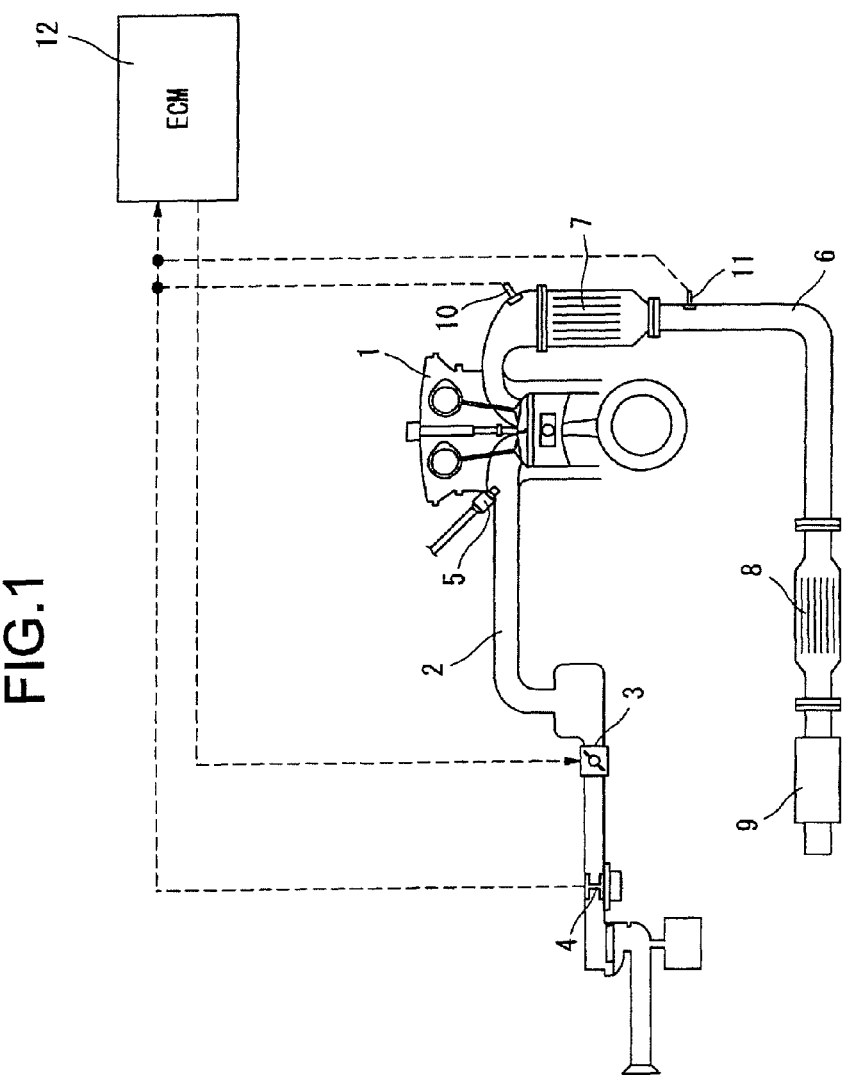
FIG. 1 A configuration diagram for explaining an internal combustion engine to which a degradation diagnosis device according to the present invention is applied.

Hereinafter, an embodiment according to the present invention will be explained in detail referring to the drawings.

FIG. 1 shows a structure of intake and exhaust systems of an internal combustion engine to which a degradation diagnosis device according to the present invention is applied. The internal combustion engine 1 is a spark-ignition engine which uses gasoline as fuel. A throttle valve 3 is provided at an intake-air passage 2 of the internal combustion engine 1. An air-flow meter 4 is also provided at the intake-air passage 2, and is located upstream from the throttle valve 3. The air-flow meter 4 functions to measure an intake-air quantity, e.g. as a mass flow rate. A fuel injection valve 5 is provided to each cylinder of the internal combustion engine and functions to inject fuel to an intake port of the each cylinder.

A first catalytic device 7 is provided in an exhaust-gas passage 6 extending toward a rear end of vehicle, such that the exhaust-gas passage 6 is cut and divided by the first catalytic device 7. The first catalytic device 7 is disposed at a relatively upstream portion of the exhaust-gas passage 6 which corresponds to a collecting portion of exhaust manifold. Moreover, a second catalytic device 8 is provided in the exhaust-gas passage 6 such that the exhaust-gas passage 6 is cut and divided by the second catalytic device 8. The second catalytic device 8 is located downstream beyond the first catalytic device 7 and is located under a floor of the vehicle. A muffler (silencer) 9 interposed in the exhaust-gas passage 6 is located downstream beyond the second catalytic device 8. A tip of the exhaust-gas passage 6 is open to an external region through the muffler 9. Each of the first catalytic device 7 and the second catalytic device 8 is composed of three-way catalyst. In order to achieve an air-fuel ratio feedback control; an upstream-side exhaust gas sensor 10 is provided upstream from (beyond) the first catalytic device 7, and a downstream-side exhaust gas sensor 11 is provided downstream from (beyond) the first catalytic device 7. A so-called linear air-fuel ratio sensor (broadband air-fuel ratio sensor) which can sense a continuous variation of air-fuel ratio or an oxygen sensor (O2 sensor) which outputs ON and OFF signals respectively representing rich and lean states can be adopted as one of the exhaust gas sensors 10 and 11. In this embodiment, the upstream-side exhaust gas sensor 10 is the linear air-fuel ratio sensor whereas the downstream-side exhaust gas sensor 11 is the oxygen sensor.

Detection signals of the upstream-side exhaust gas sensor 10 and the downstream-side exhaust gas sensor 11 are inputted to an engine control unit 12 together with signals of the other sensors and the like (not shown). As is known, a fuel injection quantity of the fuel injection valve 5 is controlled to follow a target air-fuel ratio (e.g., theoretical air-fuel ratio) by way of feedback control. That is, an air-fuel-ratio correction coefficient is calculated based on an air-fuel ratio value detected by the upstream-side exhaust gas sensor 10. Then, this air-fuel-ratio correction coefficient is multiplied by a base fuel injection quantity, so that the fuel injection quantity is corrected. Signals detected by the downstream-side exhaust gas sensor 11 are used for further correcting the air-fuel-ratio correction coefficient. Here, a responsivity of output variation of the downstream-side exhaust gas sensor 11 is reduced due to secular degradation and/or thermal degradation. Thereby, an accuracy of the air-fuel ratio control is reduced. Hence, the engine control unit 12 performs a degradation diagnosis for the downstream-side exhaust gas sensor 11. It is noted that the engine control unit 12 also performs a degradation diagnosis for the upstream-side exhaust gas sensor 10 concurrently with the degradation diagnosis for the downstream-side exhaust gas sensor 11. However, the degradation diagnosis for the upstream-side exhaust gas sensor 10 is not a main structure in the embodiment according to the present invention, and hence, explanations thereof will be omitted.

Figure 2:
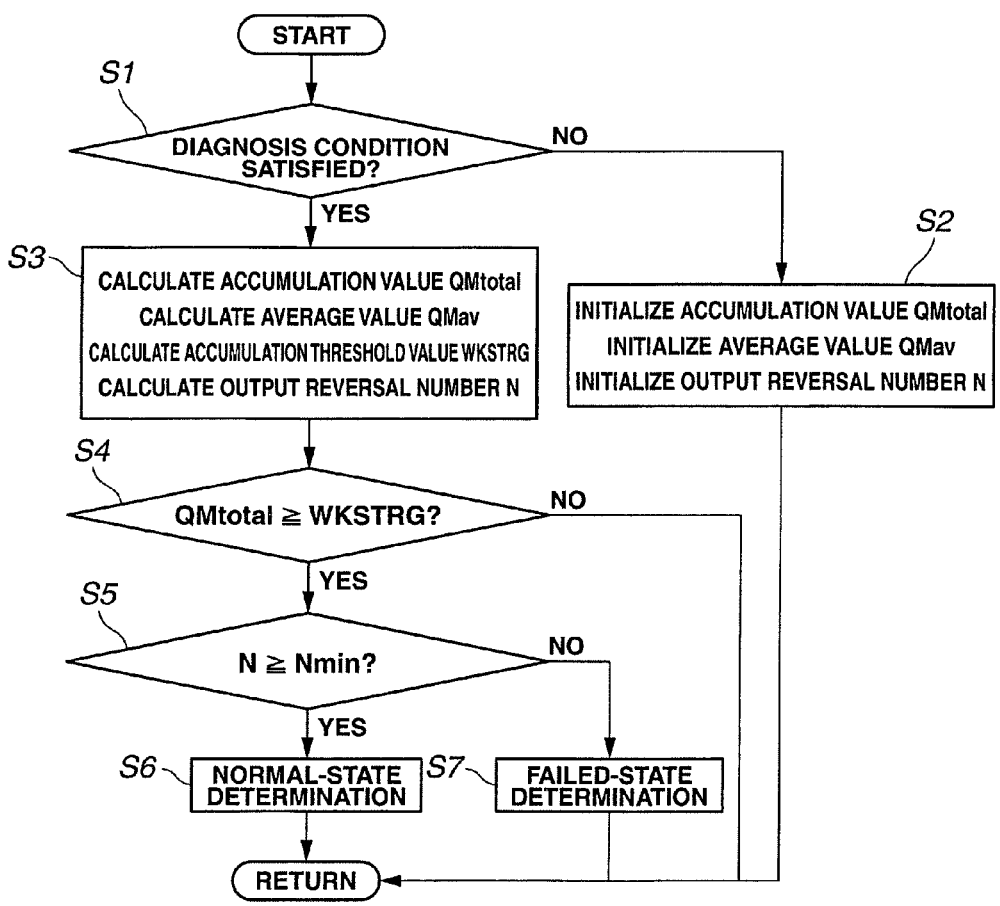
FIG. 2 A flowchart showing a process flow of degradation diagnosis.

FIG. 2 is a flowchart showing a process flow of the degradation diagnosis for the downstream-side exhaust gas sensor 11 which is executed by the engine control unit 12.

A routine shown by this flowchart is executed repeatedly at predetermined time intervals (for example, every 10 milliseconds). At step S1, it is judged whether or not a diagnosis condition which enables the degradation diagnosis has been satisfied. This diagnosis condition includes, for example, a first condition that a vehicle speed is higher than or equal to a predetermined value (e.g., 70 km/h), a is second condition that a load change is kept within a predetermined range, and a third condition that the first and second conditions have continued to be satisfied for a predetermined time or more. If at least one of these three conditions is not satisfied (or if at least one of these three conditions comes not to be satisfied during the execution of the degradation diagnosis), the routine proceeds to step S2. At step S2, after-mentioned parameters, i.e., an intake-air-quantity accumulation value (integration value) QMtotal, an intake-air-quantity average value QMav and an output reversal number N of the downstream-side exhaust gas sensor 11 are respectively initialized. Then, the routine is terminated.

If it is determined that the diagnosis condition (i.e., all of the three conditions) has been satisfied at step S1, the routine proceeds to step S3. At step S3, some parameters that are used for the degradation diagnosis are calculated. That is, an intake-air quantity (a flow quantity per unit time, i.e. flow rate) QM detected by the air-flow meter 4 is integrated or accumulated so that the intake-air-quantity accumulation value QMtotal which is a total volume of air quantity accumulated from a start of the degradation diagnosis is sequentially calculated. Moreover, the intake-air-quantity average value QMav which is an average value of the intake-air quantities QM detected by the air-flow meter 4 is calculated by a weighted average method or the like. Then, an intake-air-quantity accumulation threshold value WKSTRG is calculated by using a predetermined table or the like on the basis of the intake-air-quantity average value QMav. Accordingly, every time the routine of FIG. 2 is executed, the intake-air-quantity average value QMav is newly calculated such that the intake-air-quantity accumulation threshold value WKSTRG corresponding to the newly-calculated intake-air-quantity average value QMav is newly obtained. It is noted that the intake-air-quantity average value QMav represents an average (mean) of the intake-air quantities QM obtained from a time point at which the diagnosis condition was initially satisfied, i.e. at which the degradation diagnosis was started.

Moreover, at step S3, the number N of output reversal(s) of the downstream-side exhaust gas sensor 11 is calculated within a range from the time point at which the degradation diagnosis was started. For example, this output reversal number N is calculated by monitoring a direction of increase/decrease of an output of the downstream-side exhaust gas sensor 11 (i.e., by checking whether the output of the downstream-side exhaust gas sensor 11 is increasing or decreasing) and then by incrementing the output reversal number N by one when the output of the downstream-side exhaust gas sensor 11 turns from an increasing state to a decreasing state or from the decreasing state to the increasing state.

Next, the routine proceeds from step S3 to step S4. At step S4, it is judged whether or not the intake-air-quantity accumulation value QMtotal is larger than or equal to the intake-air-quantity accumulation threshold value WKSTRG by comparing the currently-calculated intake-air-quantity accumulation value QMtotal with the currently-calculated intake-air-quantity accumulation threshold value WKSTRG. If the intake-air-quantity accumulation value QMtotal has not reached the intake-air-quantity accumulation threshold value WKSTRG, the routine is terminated. Accordingly, the processes of steps S3 and S4 are repeated for a time period for which the diagnosis condition of step S1 continues to be satisfied. Hence, the output reversal number N continues to be measured until the intake-air-quantity accumulation value QMtotal has just reached the intake-air-quantity accumulation threshold value WKSTRG corresponding to the intake-air-quantity average value QMav which is calculated every routine.

When the intake-air-quantity accumulation value QMtotal becomes larger than or equal to the intake-air-quantity accumulation threshold value WKSTRG, the routine proceeds from step S4 to step S5. At step S5, the output reversal number N calculated in the current routine is compared with a reversal-number threshold value Nmin. If the output reversal number N is greater than or equal to the reversal-number threshold value Nmin, the routine proceeds to step S6. At step S6, it is determined that the downstream-side exhaust gas sensor 11 is normal, i.e. is not in the failed state. If the output reversal number N is smaller than the reversal-number threshold value Nmin at step S5, the routine proceeds to step S7. At step S7, it is determined that the downstream-side exhaust gas sensor 11 is in the failed state such as a degraded failure. As a matter of course, this embodiment does not necessarily need a structure in which the failed state of the downstream-side exhaust gas sensor 11 is finally decided by one-time determination (diagnosis) of step S7. That is, the failed state of the downstream-side exhaust gas sensor 11 may be finally decided by a plurality of determinations (diagnoses) as step S7.

Figure 3:
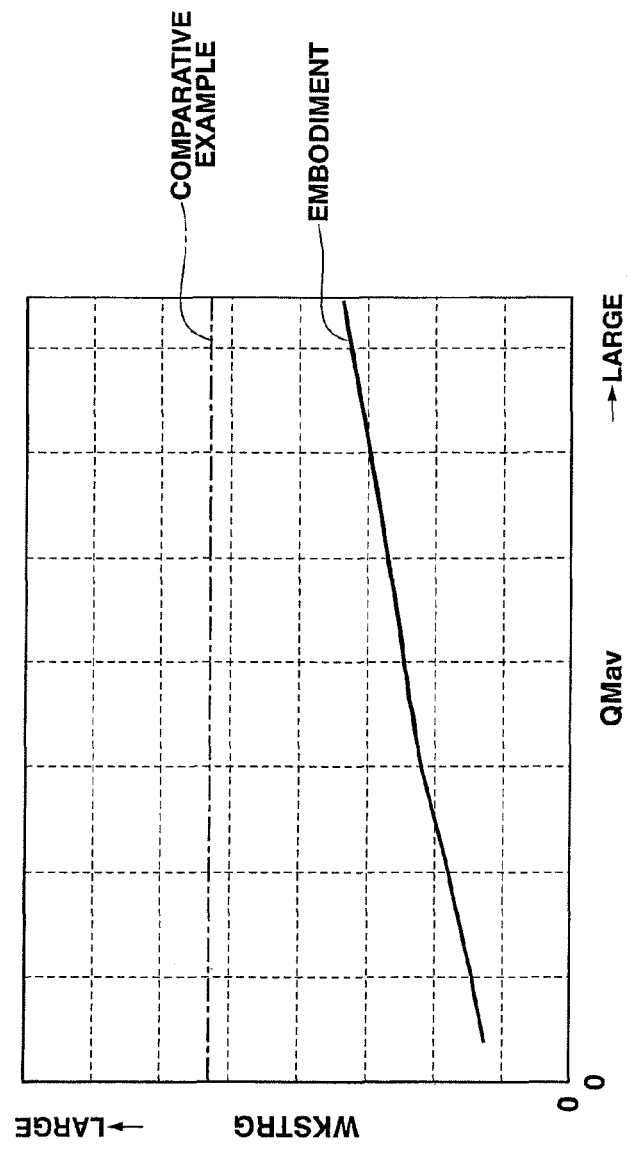
FIG. 3 A characteristic view showing a characteristic of an intake-air-quantity accumulation threshold value WKSTRG relative to an intake-air-quantity average value QMav.

FIG. 3 shows a characteristic of the intake-air-quantity accumulation threshold value WKSTRG that is set with respect to the intake-air-quantity average value QMav. As shown by a solid line of FIG. 3, the intake-air-quantity accumulation threshold value WKSTRG is given as a larger value as the intake-air-quantity average value QMav becomes larger. This setting is based on the new finding obtained by inventors of the present application. That is, the new finding is that, as the intake-air quantity (flow quantity per unit time) of the internal combustion engine becomes larger, a flow velocity of exhaust gas passing through the catalytic device and the downstream-side exhaust gas sensor becomes higher so that an exhaust-gas-quantity accumulation value or the intake-air-quantity accumulation value necessary for a single output reversal of the downstream-side exhaust gas sensor becomes larger, as mentioned above. A gradient of the characteristic shown in FIG. 3 (i.e., an increase rate of the intake-air-quantity accumulation threshold value WKSTRG relative to an increase of the intake-air-quantity average value QMav) is set at a degree by which the above-mentioned influence from the rise of flow velocity of the exhaust gas is canceled or balanced out. Here, according to a conventional recognition of a person skilled in the art, the intake-air-quantity accumulation threshold value WKSTRG is given as a constant value regardless of a magnitude (level) of the intake-air-quantity average value QMav, as shown by a comparative example depicted by a dotted line. In the example of FIG. 3, the intake-air-quantity accumulation threshold value WKSTRG varies in a linear fashion, i.e. varies in a continuous manner relative to the increase of the intake-air-quantity average value QMav. However, in this embodiment, the intake-air-quantity accumulation threshold value WKSTRG may be increased in a step-wise manner relative to the increase of the intake-air-quantity average value QMav.

FIG. 4 is a time chart showing one example of the degradation diagnosis. FIG. 4 respectively shows the vehicle speed VSP, the intake-air quantity QM, the air-fuel-ratio correction coefficient α for the air-fuel ratio feedback control, the intake-air-quantity average value QMav, the intake-air-quantity accumulation threshold value WKSTRG, and the intake-air-quantity accumulation value QMtotal. It is noted that the intake-air-quantity accumulation threshold value WKSTRG and the intake-air-quantity accumulation value QMtotal are depicted on the same graph because these values are compared with each other.

In the example of FIG. 4, when starting to execute the degradation diagnosis for the downstream-side exhaust gas sensor 11, the air-fuel ratio feedback control is switched from a normal air-fuel ratio feedback control based on air-fuel ratio values detected by the upstream-side exhaust gas sensor 10 to an air-fuel ratio feedback control based on air-fuel ratio values detected by the downstream-side exhaust gas sensor 11. A reversal period of the air-fuel-ratio correction coefficient α in the air-fuel ratio feedback control based on air-fuel ratio values detected by the downstream-side exhaust gas sensor 11 is longer than a reversal period of that in the normal air-fuel ratio feedback control based on air-fuel ratio values detected by the upstream-side exhaust gas sensor 10, because the reversal period of the air-fuel-ratio correction coefficient α in the air-fuel ratio feedback control based on air-fuel ratio values detected by the downstream-side exhaust gas sensor 11 is influenced by an oxygen storage capacity of catalyst of the first catalytic device 7.

In the example of FIG. 4, at time point t1 at which the vehicle speed has become higher than or equal to the predetermined value, the diagnosis condition is satisfied. Hence, at this time, the accumulation (totalizing) of the intake-air quantity QM is started as the intake-air-quantity accumulation value QMtotal. The intake-air-quantity accumulation value QMtotal gradually increases with elapsed time. On the other hand, the intake-air-quantity average value QMav is calculated every time the routine is executed as mentioned above. In dependence upon the calculated intake-air-quantity average value QMav, the intake-air-quantity accumulation threshold value WKSTRG is set. It is noted that calculation-execution intervals longer than in reality are shown in FIG. 4, for the purpose of illustration. In this example, at time point t2, the intake-air-quantity accumulation value QMtotal reaches the intake-air-quantity accumulation threshold value WKSTRG, i.e. becomes larger than or equal to the intake-air-quantity accumulation threshold value WKSTRG. Thereby, a diagnosis period is terminated. Although FIG. 4 does not show the output of the downstream-side exhaust gas sensor 11, the output of the downstream-side exhaust gas sensor 11 reverses so as to approximately follow the variation of the air-fuel-ratio correction coefficient α if the downstream-side exhaust gas sensor 11 is not in the degraded state. Hence, the output reversal number N over the diagnosis period between time point t1 and time point t2 is measured. Then, by comparing this output reversal number N with the reversal-number threshold value Nmin, the diagnosis for degradation is conducted.

Here, the degradation diagnosis can be performed also by using the air-fuel-ratio correction coefficient α which causes periodic increase and decrease variations by the normal air-fuel ratio feedback control based on air-fuel ratio values detected by the upstream-side exhaust gas sensor 10 in a case that specific conditions are satisfied (for example, in a case that a catalyst dose not exert the oxygen storage capacity). Alternatively, by suspending (i.e., temporarily cancelling) the air-fuel ratio feedback control based on air-fuel ratio values detected by the upstream-side exhaust gas sensor 10, the air-fuel-ratio correction coefficient α may be forced to increase and decrease with a predetermined period for the purpose of the degradation diagnosis.

Moreover, the reversal-number threshold value Nmin may be a fixed value. Alternatively, the reversal-number threshold value Nmin may be set properly in accordance with an operating condition of the engine and/or the reversal period of the air-fuel-ratio correction coefficient α at that time or the like.

In the above embodiment, as a result, as the average intake-air quantity obtained between the start of the diagnosis (time point t1) and an end of the diagnosis (time point t2), i.e. the intake-air-quantity average value QMav becomes larger, the intake-air-quantity accumulation value QMtotal accumulated until the end of the diagnosis becomes larger. Therefore, the influence which is given to the output reversal of the downstream-side exhaust gas sensor 11 in the case that the flow velocity of the exhaust gas passing through the first catalytic device 7 and the downstream-side exhaust gas sensor 11 is high due to the large value of the intake-air quantity (flow quantity per unit time) QM can be cancelled. By that much, the accuracy of the degradation diagnosis is improved. In particular, every time the intake-air-quantity average value QMav given from the diagnosis start (time point t1) is sequentially (repeatedly) calculated, the intake-air-quantity accumulation threshold value WKSTRG is set to correspond to the intake-air-quantity average value QMav. Hence, an influence from the intake-air quantity QM which tends to change in a short time is appropriately grasped, and this influence can be directly reflected in the degradation diagnosis. Accordingly, for example, a risk is avoided that a time length necessary for the degradation diagnosis is made to be excessively long so as to reduce an execution frequency of the degradation diagnosis.

What is claimed is:

1. A degradation diagnosis device for an exhaust gas sensor provided downstream from a catalytic device in an exhaust-gas passage of an internal combustion engine, the degradation diagnosis device comprising:
    a diagnosis-period setting section configured to calculate an accumulation value by accumulating an intake-air quantity of the internal combustion engine from a start time of a diagnosis, and to terminate a diagnosis period when the accumulation value reaches an intake-air-quantity accumulation threshold value;
    a degradation judging section configured to judge whether the exhaust gas sensor is in a degraded state on the basis of a reversal number of an output of the exhaust gas sensor over the diagnosis period; and
    a threshold-value setting section configured to set the intake-air-quantity accumulation threshold value according to the intake-air quantity such that the intake-air-quantity accumulation threshold value becomes larger as the intake-air quantity becomes larger.

2. The degradation diagnosis device according to claim 1, wherein the threshold-value setting section is configured
    to calculate an average value of the intake-air quantity given from the start time of the diagnosis, at predetermined time intervals, and
    to sequentially set the intake-air-quantity accumulation threshold value on the basis of the average value of the intake-air quantity.

3. A degradation diagnosis method for an exhaust gas sensor provided downstream from a catalytic device in an exhaust-gas passage of an internal combustion engine, the degradation diagnosis method comprising steps of:
    setting an intake-air-quantity accumulation threshold value according to an intake-air quantity of the internal combustion engine such that the intake-air-quantity accumulation threshold value becomes larger as the intake-air quantity becomes larger;
    calculating an accumulation value by accumulating the intake-air quantity from a start time of a diagnosis, and terminating a diagnosis period when the accumulation value reaches the intake-air-quantity accumulation threshold value; and
    judging whether the exhaust gas sensor is in a degraded state on the basis of a reversal number of an output of the exhaust gas sensor over the diagnosis period.

4. The degradation diagnosis method according to claim 3, wherein the step of setting the intake-air-quantity accumulation threshold value includes
    calculating an average value of the intake-air quantity given from the start time of the diagnosis, at predetermined time intervals, and
    sequentially setting the intake-air-quantity accumulation threshold value on the basis of the average value of the intake-air quantity.

* * * * *